(12) United States Patent
Hioki (10) Patent No.: US 8,035,493 B2
(45) Date of Patent: Oct. 11, 2011

(54) HEAD-UP DISPLAY DEVICE FOR VEHICLE

(75) Inventor: Shinjiro Hioki, Saitama (JP)

(73) Assignee: Calsonic Kansei Corporation, Saitama-shi (JP)

( * ) Notice: Subject to any disclaimer, the term of this patent is extended or adjusted under 35 U.S.C. 154(b) by 323 days.

(21) Appl. No.: 12/327,134

(22) Filed: Dec. 3, 2008

(65) Prior Publication Data

US 2009/0140845 A1 Jun. 4, 2009

(30) Foreign Application Priority Data

Dec. 4, 2007 (JP) ................................. 2007-313390

(51) Int. Cl.
*B60Q 1/00* (2006.01)
(52) U.S. Cl. ..................... 340/425.5; 340/435; 340/436; 340/441; 340/461; 340/457.1; 340/457.4; 340/691.6; 340/995.1; 345/7; 345/8; 345/633
(58) Field of Classification Search ............... 340/425.5, 340/937, 945, 947, 952, 953, 435–441, 461, 340/457.1, 457.4, 955.1–995.15, 815.4; 701/1, 701/36, 207, 208, 300; 180/168, 169; 345/660, 345/7, 8, 633
See application file for complete search history.

(56) References Cited

U.S. PATENT DOCUMENTS

| | | | |
|---|---|---|---|
| 6,718,187 B1 * | 4/2004 | Takagi et al. | 455/569.2 |
| 6,806,848 B2 * | 10/2004 | Hirao et al. | 345/3.4 |
| 7,245,273 B2 * | 7/2007 | Eberl et al. | 345/7 |
| 2002/0067366 A1 * | 6/2002 | Hirao et al. | 345/660 |
| 2002/0101568 A1 * | 8/2002 | Eberl et al. | 351/211 |
| 2005/0154505 A1 * | 7/2005 | Nakamura et al. | 701/1 |

FOREIGN PATENT DOCUMENTS

JP 2001-357498 A 12/2001

* cited by examiner

*Primary Examiner* — George Bugg
*Assistant Examiner* — Sisay Yacob
(74) *Attorney, Agent, or Firm* — Foley & Lardner LLP (57) ABSTRACT

A head-up display device includes a light source, a display unit for producing display virtual images including an alarm display image, a mirror for reflecting the light to show the alarm display image in a field of front view of a driver, at least one on-vehicle device that the driver operates, a visual-line shift detecting means and a display position shifting means. The mirror reflects the light representing the alarm display image so that a driver can see the alarm display image in a display area that is set on one of a front windshield and a combiner in front of the driver and in a field of front vision of the driver. The visual-line shift detecting means detects a visual line shift of the driver from a usual forward visual range of the driver toward the on-vehicle device that the driver operates. The display position shifting means shifts positions of the display area to a position between the usual forward visual range and a portion/part, of the on-vehicle device at operation, which the driver watches during the operation when the visual-line shift detecting means detects the visual line shift from the usual forward visual range toward the on-vehicle device.

20 Claims, 7 Drawing Sheets

HEAD-UP DISPLAY DEVICE FOR VEHICLE

BACKGROUND OF THE INVENTION

1. Field of the Invention

The present invention relates to a head-up display device, for a vehicle, that provides a driver with information through a virtual image projected on a combiner, front windshield or the like in a driver's direct line of sight.

2. Description of the Related Art

A conventional head-up display device for vehicles is disclosed in Japanese Patent Application Laying-Open publication No. 2001-357498. This conventional head-up display device includes an obstacle detecting means for detecting an obstacle in front of a driver, a regard point detecting means for detecting a point of regard of the driver, a projector for projecting a virtual display image representing various information to a driver, and a display changing means for changing the information represented by the virtual display image according to the movement of the point of regard and also for changing a size of a display area according to a vehicle running environment and a driver's skill.

The above known conventional head-up display device, however, encounters a problem in that it is difficult for a driver to early become aware of the virtual display image, especially a warning display image, produced by the head-up display device when the driver looks away considerably from his or her usual forward viewpoint while the driver drives, in order to operate a switch of an on-vehicle device, such as a mirror-angle adjustment switch provided on a driver's door, which is distant from the usual forward viewpoint, because positions of the display virtual image and the display area are fixed to be accommodated to the usual forward viewpoint.

It is, therefore, an object of the present invention to provide a head-up display device, for a vehicle, which overcomes the foregoing drawbacks and can help a driver recognize a display image representing information produced by a head-up display device earlier when the driver operates an on-vehicle device.

SUMMARY OF THE INVENTION

According to a first aspect of the present invention there is provided a head-up display device for a vehicle including a light source for projecting light, a display unit for producing display virtual images including an alarm display image, a mirror, at least one on-vehicle device that the driver operates, a visual-line shift detecting means and a display position shifting means. The mirror reflects the light representing the alarm display image so that a driver can see the alarm display image in a display area that is set on one of a front windshield and a combiner in front of the driver and in a field of front vision of the driver. The visual-line shift detecting means detects a visual line shift of the driver from a usual forward visual range of the driver toward the on-vehicle device that the driver operates. The display position shifting means shifts positions of the display area from a position of the usual forward visual range to a position on a line between the usual forward visual range of the driver and the on-vehicle device at operation, which the driver watches during the operation, when the visual-line shift detecting means detects the visual line shift of the driver from the usual forward visual range toward the on-vehicle device.

Therefore, the head-up display device of the invention can help the driver recognize the display image representing the information produced by the head-up display device earlier when the driver looks away from the usual forward visual range to operate the on-vehicle device.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Throughout the following detailed description, similar reference characters and numbers refer to similar elements in all figures of the drawings, and their descriptions are omitted for eliminating duplication.

Figure 1:
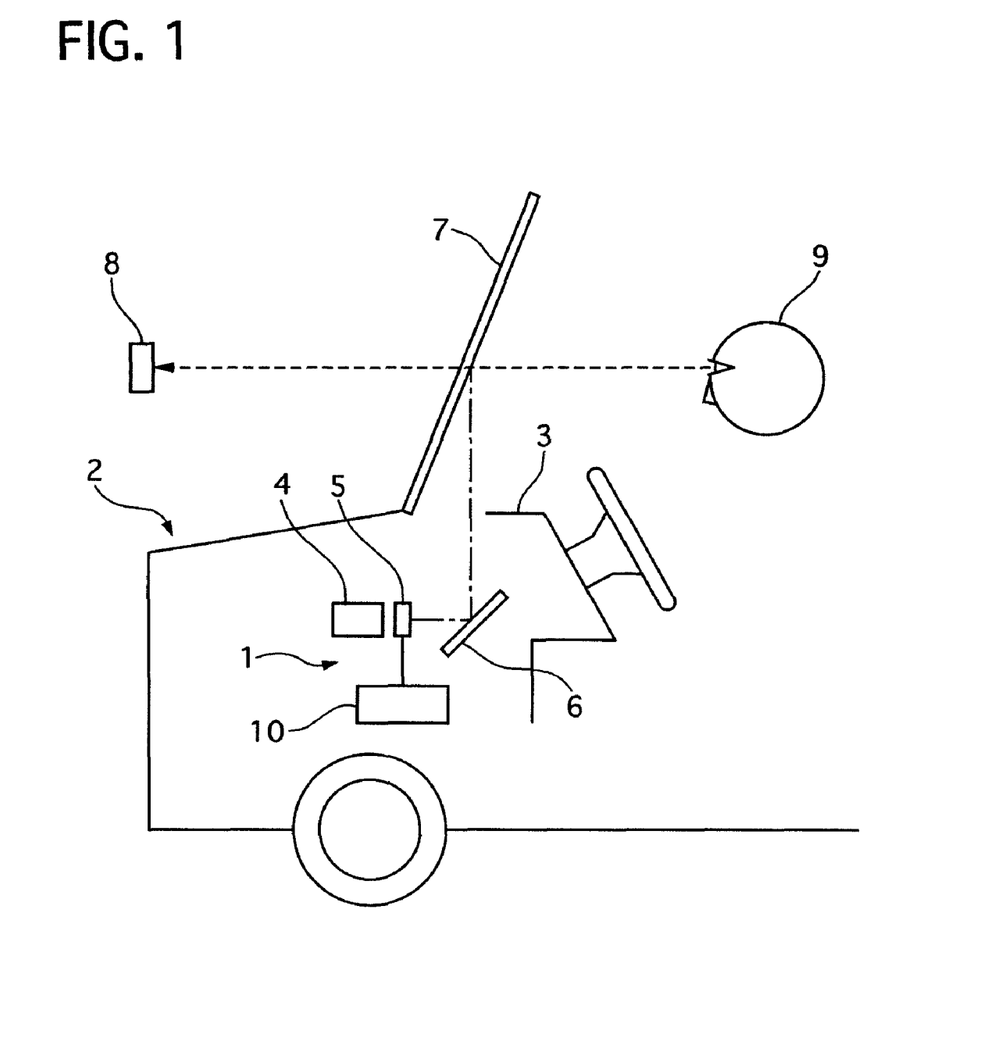
FIG. 1 is a schematic side diagram showing a motor vehicle that is provided with a head-up display device of a first embodiment according to the present invention.
Figure 2:
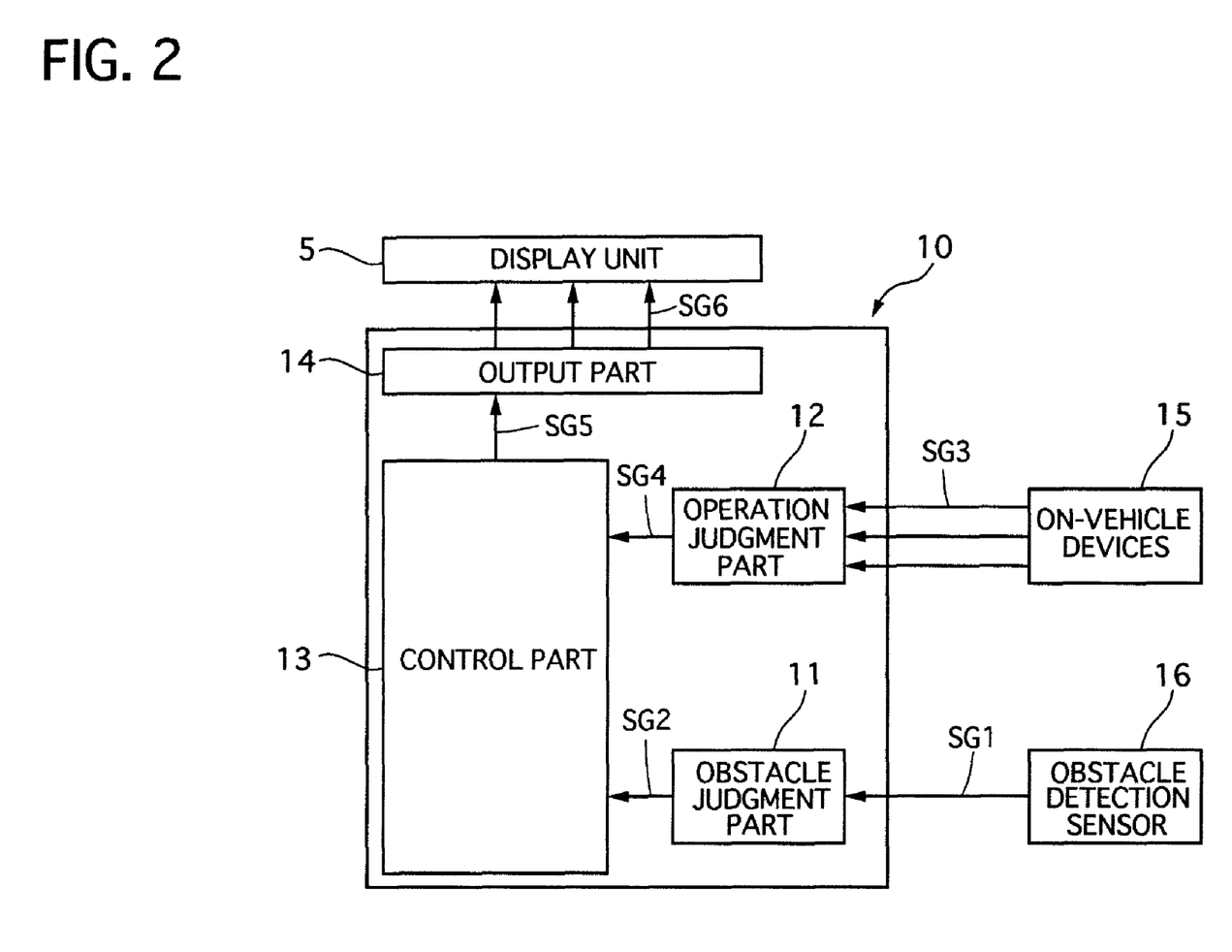
FIG. 2 is a control block diagram showing a display controller and its peripheral parts of the head-up display device of the first embodiment shown in FIG. 1.

Referring to FIG. 1 and FIG. 2 of the drawings, there is shown a first preferred embodiment of a head-up display device according to the present invention.

The head-up display device 1 of the first embodiment is used for a motor vehicle 2, and it is installed in an instrument panel 3. The head-up display device 1 includes a light source 4, a liquid crystal display (LCD) 5, a mirror 6 and a display controller 10.

Figure 3:
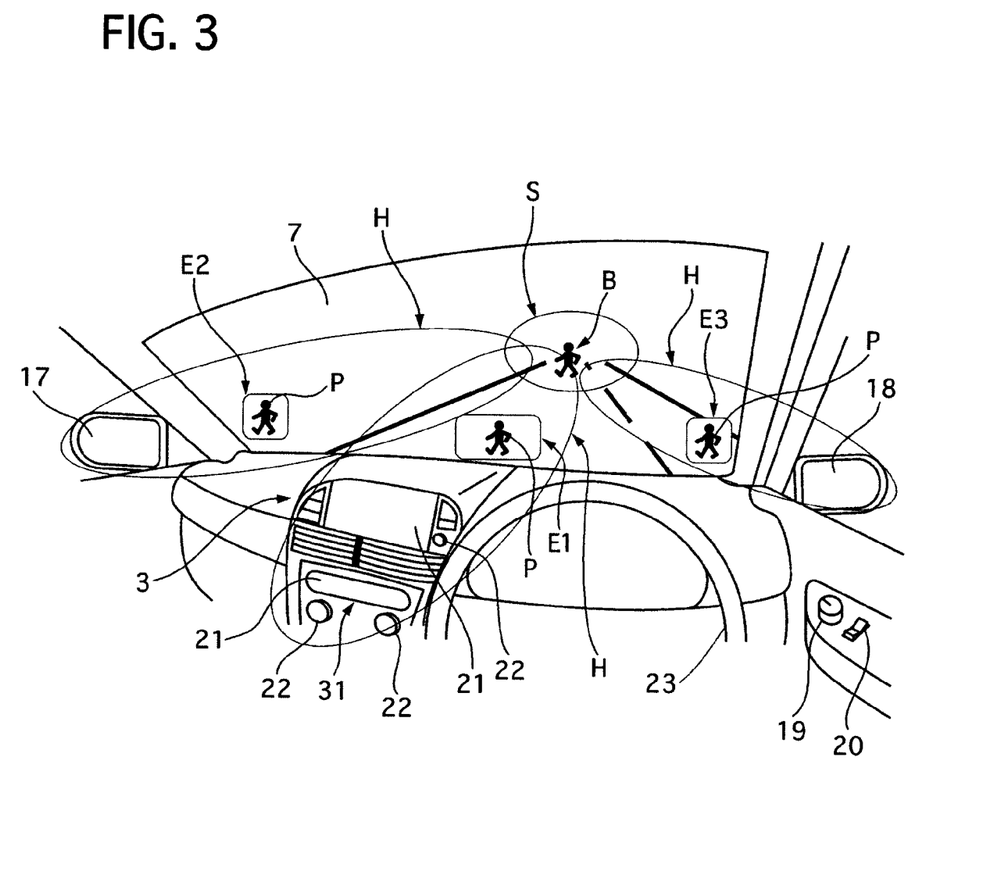
FIG. 3 is a view showing a field of front vision from a driver's seat, where virtual display images are produced by the head-up display device before a front windshield in three cases where view lines of a driver changes.

The light source 4 is capable of projecting light to the LCD 5, where the LCD 5 produces light with information such as a vehicle speed and others including an alarm for an obstacle in front of the motor vehicle 2. The light is reflected on the mirror 6 toward a front windshield 7 to show virtual images 8 and an alarm display image P, so that a driver 9 can see the virtual image 8 including an alarm display image P in a display area before the front windshield 7, together with a driver's front vision as shown in FIG. 3. Accordingly, the driver 9 can see the information produced by the LCD 5 without requiring the driver 9 to look away from a driver's usual forward visual range S, shown in FIG. 3, when the driver drives. This ensures driver's safe driving.

The mirror 6 is capable of changing its angle so as to change a reflection direction of the light by using a not-shown electric motor. This enables the display area to be moved on the windshield 7.

The display controller 10 carries out the display control of the LCD 5 for producing the information and setting its display area, such as a normal display area in the usual forward visual range S, an intermediate display area E1, a left side display area E2 and a right side display area E3.

The normal display area is used for showing the alarm display image P and/or the information on the vehicle speed and others necessary for driving when the head-up display device 1 is activated, and the position of the normal display area is determined based on a steering angle of a steering wheel 23 and a vehicle speed. The lateral directional position of the normal display area is moved toward the left side when the driver operates the steering wheel in a left direction, while it is moved toward the right side when the driver operates the steering wheel in a right direction. The movement amount of the normal display area depends on the steering angle. The vertical directional position of the normal display area is set to change according to the vehicle speed. The position thereof is set to be higher as the vehicle speed increases. Accordingly, the display controller 10 is electrically connected to a steering sensor for detecting the steering angle and a vehicle speed sensor for detecting the vehicle speed.

On the other hand, in this embodiment, the intermediate display area E1, the left side display area E2 and the right side display area E3 are examples of areas that are used for showing only the alarm display images P when the driver look away from a driver's usual forward visual range S to operate a portion/part of an on-vehicle device 15. The intermediate display area E1, the left side display area E2 and the right side display area E3 are positioned at an intermediate portion of the windshield 7, a left side portion thereof and a right side portion thereof, respectively, and below the normal display area, where the intermediate display area E1 is used when the driver see one of monitor screens of monitors 21 that are provided on a center console 31 integrally formed with the instrument panel 3, the left side display area E2 is used when the driver operates to change an angle of a left door mirror 17 as the portion/part of the on-vehicle device 15, and the right side display area E3 is used when the driver operates to change an angle of a right door mirror 18.

Incidentally, as shown in FIG. 3, the center console 31 further has switches 22 of the on-vehicle devices 16 such as the audio device, the navigation device and the air-conditioner device. On of the on-vehicle devices 15 includes an angle adjustment switch 19 for adjusting angles of the left door mirror 17 and the right door mirror 18, and with a left-right shift switch 20 thereof as shown in FIG. 3, in addition to an audio operation switch, a navigation operation switch and an air-conditioner operation switch and others.

The display controller 10 has an obstacle judgment part 11, an operation judgment part 12, a control part 13 and an output part 14.

The display controller 10 has an obstacle judgment part 11, an operation judgment part 12, a control part 13 and an output part 14. The control part 13, the output part 14 and the mirror 6 correspond to a display position shifting means of the present invention.

The obstacle judgment part 11 is electrically connected to an obstacle detection sensor 16 in order to detect an obstacle, including a pedestrian B as shown in FIG. 3, located in front of the motor vehicle 2. The obstacle detection sensor 16 uses a stereo-camera, or an infrared radar for example, and it sends an obstacle detection signal SG1 to the obstacle judgment part 11.

The obstacle judgment part 11 executes an obstacle detection process for recognizing a position of the obstacle and a distance between the obstacle (the pedestrian B for example) and the motor vehicle 2 based on the obstacle detection signal SG1. The obstacle judgment part 11 outputs an obstacle judgment signal SG2 to the control part 13 when it recognizes that the obstacle to be avoided exists before the motor vehicle 2.

Incidentally, the obstacle detection sensor 16 and the obstacle judgment part 11 correspond to a visual-line shift detecting means of the present invention. The obstacle detection sensor 16 and the obstacle judgment part 11 also correspond to an obstacle detection means and an obstacle judgment means of the present invention, respectively.

On the other hand, the operation judgment part 12 is electrically connected to a plurality of on-vehicle devices 15 to receive operation detection signals SG3 in order to judge which on-vehicle device 15 is operated. When it judges, it outputs an operation judgment signal SG4 to the control part 13.

The control part 13 is electrically connected to the obstacle judgment part 11 and the operation judgment part 12 to receive the obstacle judgment signal SG2 and the operation judgment signal SG4, respectively.

When the control part 13 receives the operation judgment signal SG4 from the operation judgment part 12, it determines the position of the display area, such as the display area E1, E2 or E3 according to which on-vehicle devices 15 is operated, and it also judges, based on the operation detection signal SG3, whether or not the operation of the operation-detected on-vehicle device 15 requires more than a first predetermined time. The first time is set to remove unnecessary display of the display area, instantaneous or very short time for the operation. The control part 13 outputs a display area shift signal SG5 to the output part 14.

The output part 14 controls the display unit 5 to display the driving information and/or the alarm display P at an optimum position when it receives the display area shift signal SG5.

Incidentally, the positions of the display areas where the alarm display P is shown varies on the windshield 7, and they are set on a line between the usual visual range S and the on-vehicle device 15 that the driver watches operating it. In other words, the on-vehicle device 15 that the driver watches operating may be a switch, a monitor screen, a mechanical portion/part to be changed, or others. This is determined according to the contents of the operation. It is preferred that the on-vehicle device 15 determining the line be one that the driver watches for longer time.

For example, as shown in FIG. 3, the display area is moved to appear on a central lower portion of the front windshield 7 as the intermediate display area E1 when the driver 9 operates the on-vehicle device 15 watching the monitor screen of the monitor 21 provided in the center console 31. That is, the intermediate display area E1 is set substantially on a line between the monitor screen and the usual visual range S. The display area is moved to appear on a lower portion at the most-left side of the front windshield 7 as the left side display area E2 when the driver 9 chooses to operate the left door mirror 17 by using the left-right shift switch 20 and operates the angle adjustment switch 19 to adjust the angle of the left door mirror 17. That is, the left side display area E2 is set substantially on a line between the left door mirror 17 and the usual visual range S. Similarly, the display area is moved to appear on a lower portion at the most-right side of the front windshield 7 as the right side display area E3 when the driver 9 chooses to operate the right door mirror 18 by using the left-right shift switch 20 and operates the angle adjustment switch 19 to adjust the angle of the right door mirror 18. That is, the right side display area E3 is set substantially on a line between the right door mirror 18 and the usual visual range S.

Note that the left side display area E2 is substantially on a line between the usual visual range S and the left door mirror 17 (not the angle adjustment switch 19), and also note that the right side display area E3 is substantially on a line between the usual visual range S and the right door mirror 18 (not the angle adjustment switch 19). Because the driver watches the left or right door mirror 17 or 18 for longer time during the operation than the operation of the angle adjustment switch 19 and the left-right shift switch 20.

Like the left and right door mirrors 17 and 18, portions/parts of the on-vehicle devices 16 at operation, the driver 9 watches during the operation are usually not switches the driver operates, but most of the portions/parts are monitors or objects the driver 9 wants to change. For, example, the portion/part corresponds to the monitor screen 21 of an audio device, a navigation device, an air conditioner device and/or others, although the monitor 21 may be far apart from or near the devices 16 and the switches 22 thereof.

The operation and advantages of the head-up display device of the first embodiment will be described.

When the driver 9 drives the motor vehicle 2 and the head-up display device 1 is activated, the display unit 5 produces the virtual display images representing the driving information on the vehicle speed and others. The light emitted from the light source 4 is reflected on the mirror 6 toward the front windshield 7 after it passes through the display unit 5. The angle of the mirror 6 is set so that the light is reflected on the front windshield 7 directly in front of the driver's usual forward visual range S so that the driver can see the virtual display image 8 together with the field of front view S.

Figure 4:
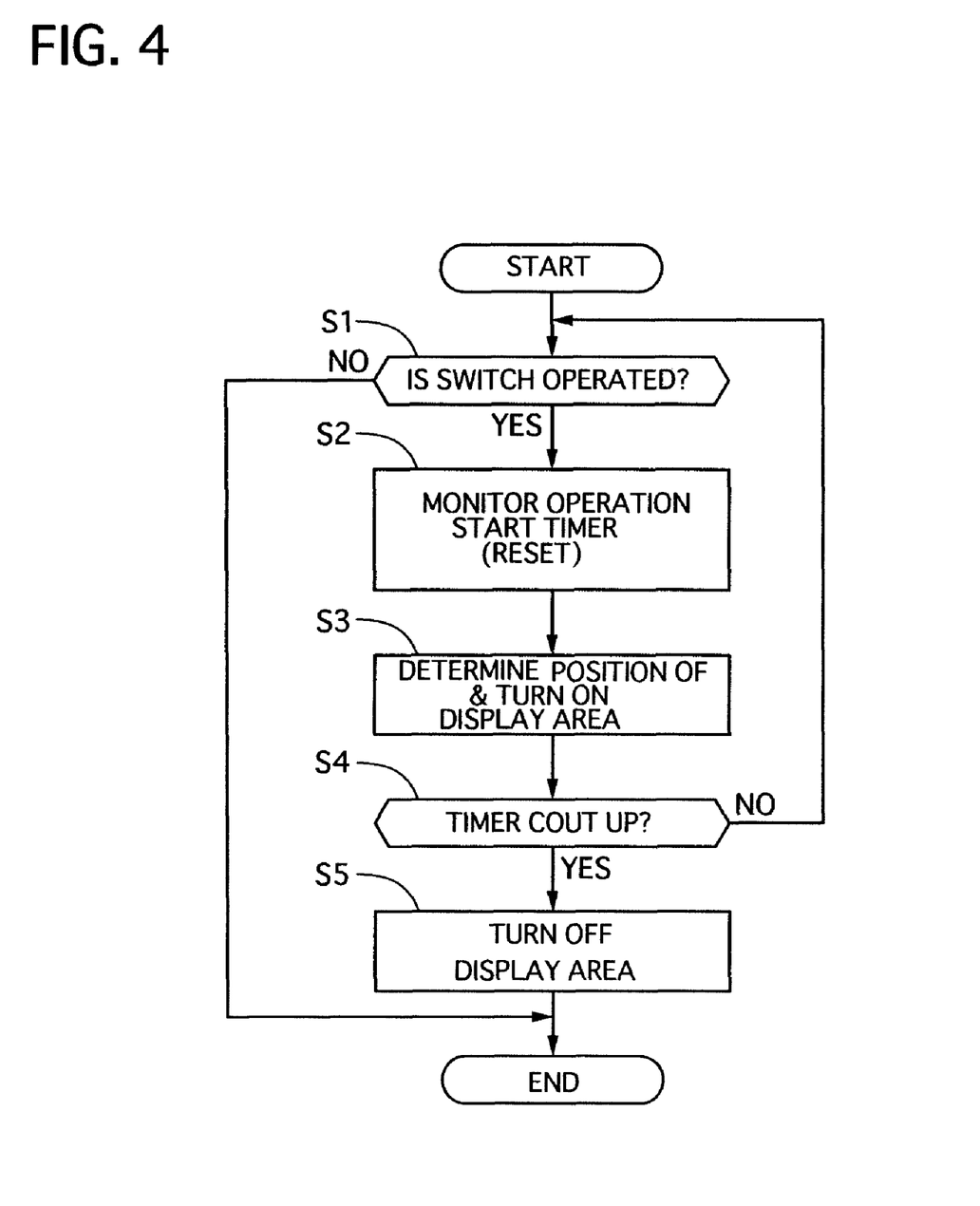
FIG. 4 is a flowchart of display area shifting control executed by the control part shown in FIG. 2.

When the driver turns away his or her head from the usual visual range S to operate one of the on-vehicle devices 16, the display controller 10 executes a display area shifting control by using a flowchart shown in FIG. 4.

At step S1, the operation judgment part 12 receives the operation detection signal SG3 from the on-vehicle devices 15 to judge, based on the operation detection signal SG3, which on-vehicle devices 15 is operated and whether or not the operation requires more than the first predetermined time. If the judgment is YES, the flow goes to step S2, while if it is No, the current flow ends and the step S1 is repeated.

At the step S2, the control part 13 sets a not-shown timer to be reset and start counting time when it receives the operation judgment signal SG4, and then the flow goes to step S3.

At the step S3, the control part 13 determines the position of the display area and turns on the display area outputs based on the contents of the operation, and it outputs a display signal SG5 to the output part 14. In this process, the display area is set, for example, at the intermediate display area E1 when the driver operates watching the monitor 12, the left side display area E2 when the driver tries to adjust the angle of the left door mirror 17, or the right side display area E3 when the driver tries to adjust the angle of the right door mirror 18, in such a way that it appears on the line between the usual visual range S and the on-vehicle at operation that is being operated, and then the flow goes to step S4.

At the step S4, the control part 13 judges, based on the operation detection signal SG3, whether or not the timer counts up a second predetermined time. The second predetermined time is set to have sufficient time for the driver to notice the alarm display P at the determined display area, such as E1, E2 or E3, during the operation. If the judgment is YES, the flow goes to step S5, while if the judgment is NO, the flow returns to the step S1.

At the step S5, the control part 14 controls the on-vehicle device 15 that is being operated so that the shifted display area turns off, and then the flow ends.

Figure 5:
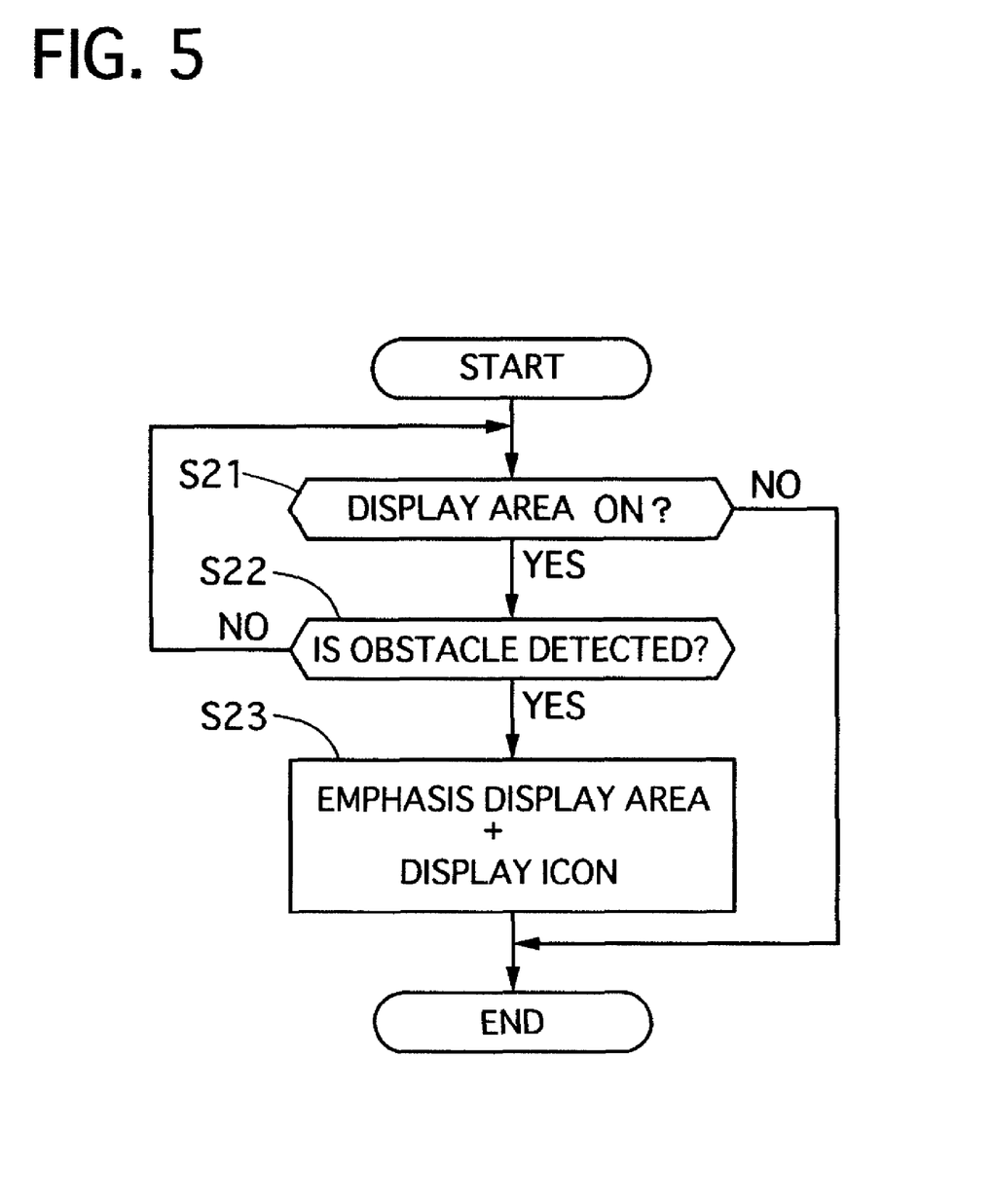
FIG. 5 is a flowchart of alarm display image setting control executed by the display controller shown in FIG. 2.

Therefore, the position of the display area can be shifted according to the operation of the on-vehicle device 16 being operated, which can help the driver recognize the display image representing the information produced by the head-up display device earlier when the driver operates the on-vehicle device On the other hand, when the obstacle judgment part 11 recognizes the obstacle such as a pedestrian B in front of the motor 2, the display controller 10 executes an alarm display image setting control by using a flowchart shown in FIG. 5.

At step S21, the control part 13 judges whether or not the display area is set to be displayed on the front windshield 7. If its judgment is YES, the flow goes to step S22, while if it is NO, the flow ends.

At the step S22, the obstacle judgment part 11 judges whether or not the obstacle is recognized in front of the motor vehicle 2, based on the obstacle detection signal SG1 outputted from the obstacle detection sensor 16. If its judgment is YES, the flow goes to step S23, while if it is NO, the flow goes to the step S21. Note that, even if it is NO, the control part 13 may control the output part 14 so that the alarm display P can be seen in the usual visual range S by the driver.

At the step S23, the control part 13 receives the obstacle judgment signal SG2 outputted from the obstacle judgment part 11, and it controls the output part 14 so that the alarm display P is produced and shown on the windshield 7 at the display area, such as E1, E2 or E3, set to be located on a line between the usual visual range S and the on-vehicle device at the step S3 in the flowchart shown in FIG. 4.

In this process, the display area E1, E2, E3 is emphasized by changing its color and that the alarm display image P is produced in front of the driver 9. The emphasis of the color of the display area E1, E2, E3 are executed by changing colors from green to yellow or orange for example, and the alarm display image P1 is shown by an icon indicating a mark of caution P1 shown in FIG. 7. In addition, an icon indicating a pedestrian B is produced and displayed. This emphasis can promote awareness of the driver to avoid a danger.

Then after the timer counts up the time, the alarm display P is turned off together with the display area.

Figure 6:
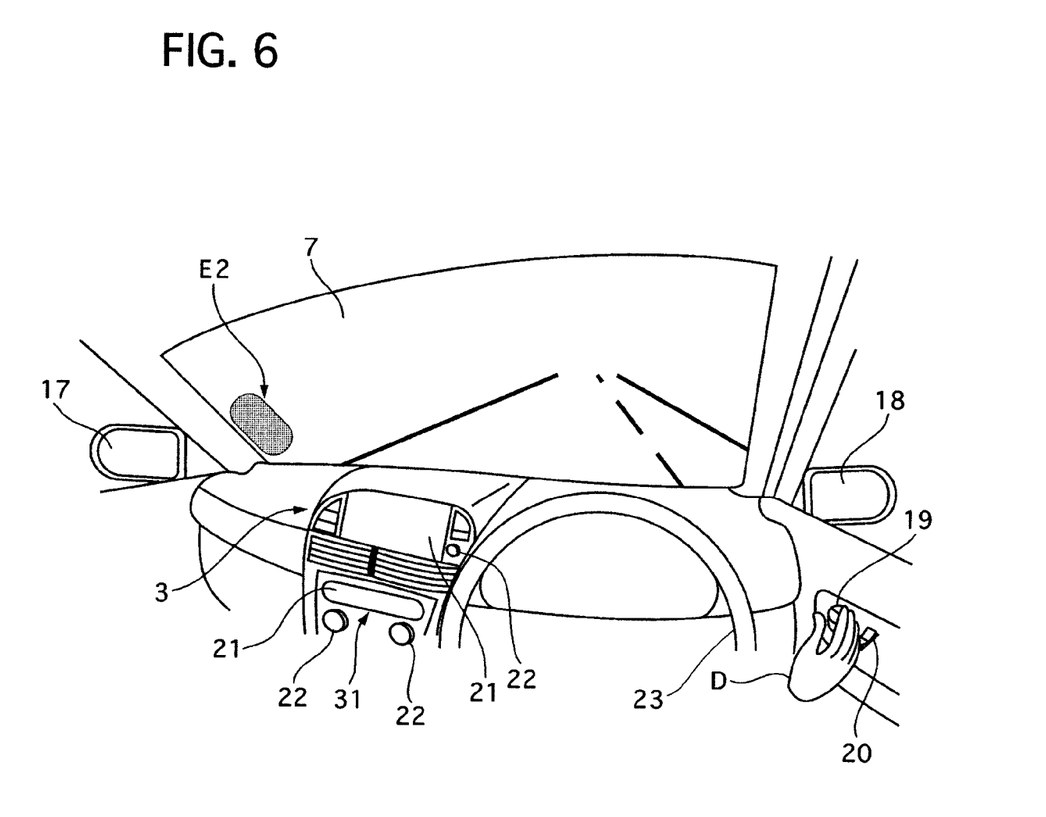
FIG. 6 is a view showing a field of front vision from the driver's seat in a case where a left door mirror is operated to change its angle.
Figure 7:
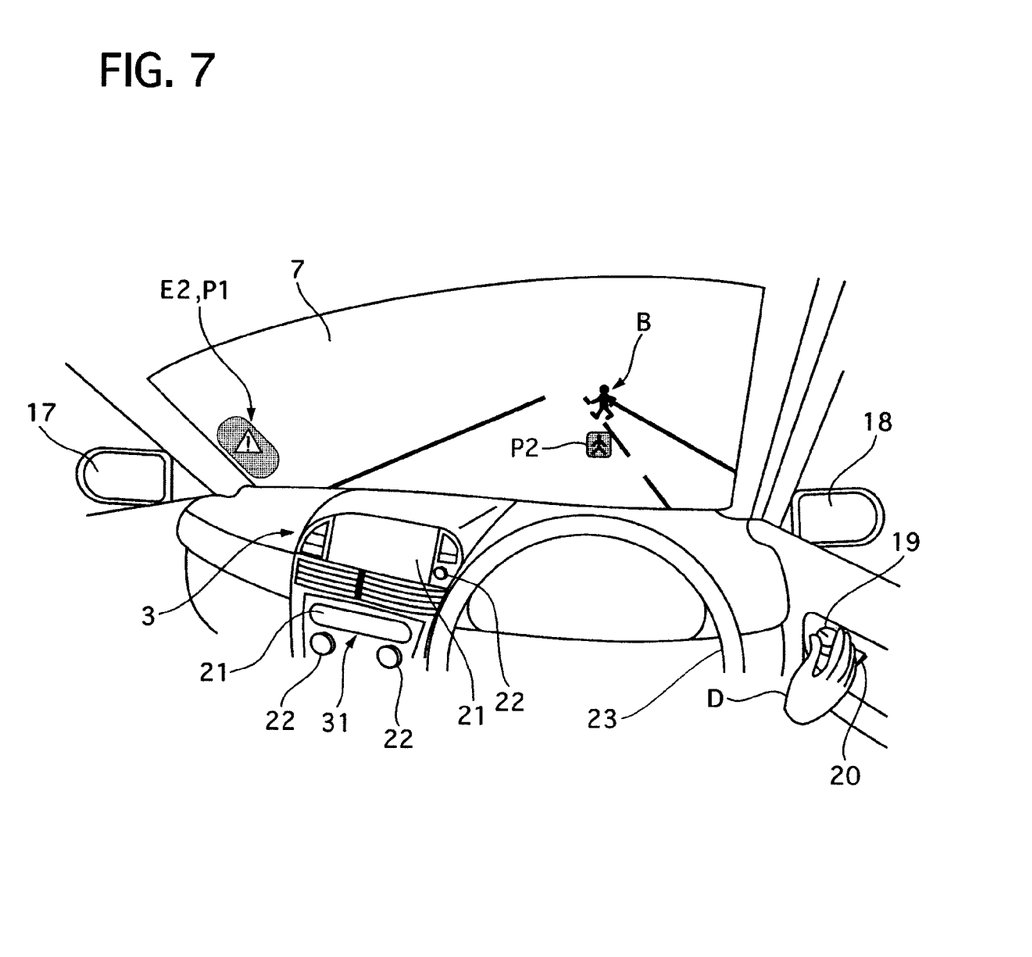
FIG. 7 is a view showing the field of front vision from the driver's seat in a case where a left door mirror is operated to change its angle and an obstacle is detected in front of the motor vehicle.

FIG. 6 shows an example of the virtual display images during the operation for changing the angle of the left door mirror 17 when the obstacle is not detected, and FIG. 7 shows an example of the virtual images during the operation for changing the angle of the left door mirror 17 when the obstacle is detected.

In this operation for changing the angle of the left door mirror 17, the driver 9 starts to operate the left-right shift switch 20 and select the left door mirror 17 and then operates the angle adjustment switch 19. The driver's eyes alternately moves in a range H, as shown in FIG. 3, between the left door mirror 17 and the switches 19 and 20. This visual line shift is detected by the operation detection signal SG1 outputted from the switches 19 and 20, and the display area is set to appear as the left side display area E2 on a lower portion of the most-left side of the windshield 7 to show the alarm display P. The virtual display image 8 including the alarm display P is produced in the display area E2, which can help the driver 9 earlier recognize the information on that there is an obstacle, such as the pedestrian B, in front of the motor vehicle, so that he or she can quickly response it even when the driver's eyes are not directed toward the obstacle.

In addition, in the operation for changing the angle of the left door mirror 17 when the pedestrian B is detected, the display area E with the caution icon P1 is displayed at the lower portion of the most-left side of the windshield 7 similarly to those in the former operation, and the icon of the pedestrian B is also displayed at the position under the pedestrian B shown in the field of front view.

While there have been particularly shown and described with reference to preferred embodiments thereof, it will be understood that various modifications may be made therein, and it is intended to cover in the appended claims all such modifications as fall within the true spirit and scope of the invention.

In the embodiment, the virtual display image including the alarm display image P is projected on the front windshield 7 by the mirror 6, while it may be projected on a combiner that is located in front of a driver.

In the embodiment, the head-up display device 1 has only one LCD 5 and one mirror 6, while it may be provided with a plurality of LCDs and mirrors so that they are designed to produce a plurality of display virtual images including an alarm display image on different positions on a front windshield or a combiner.

Only one head-up display device 1 is employed and the display area E1, E2, E3 is shifted by using a rotation of the mirror 6 in the embodiment, while a plurality of head-up display devices may be used to shift the display area such as E1, E2, E3 and produce the virtual display image.

The visual-line shift detecting means of the invention may employ a camera or a radar device for detecting a state of a visual line of a driver 9 instead of the detection of the operation of the on-vehicle device.

The head-up display device 1 may be used not only for motor vehicles, but for vehicles such as aircraft.

The entire contents of Japanese Patent Application No. 2007-313390 filed Dec. 4, 2007 are incorporated herein by reference.

What is claimed is:

1. A head-up display device for a vehicle comprising:
a light source for projecting light;
a display unit for producing display virtual images including an alarm display image;
a mirror for reflecting the light representing the alarm display image so that a driver can see the alarm display image in a display area that is set on one of a front windshield and a combiner in front of the driver and in a field of front vision of the driver;
at least one on-vehicle device that the driver operates;
a visual-line shift detecting means for detecting a visual line shift of the driver from a usual forward visual range of the driver toward the at least one on-vehicle device that the driver operates; and
a display position shifting means for shifting positions of the display area from a position of the usual forward visual range to a position on a line between the usual forward visual range and the at least one on-vehicle device at operation, which the driver watches during the operation, when the visual-line shift detecting means detects the visual line shift from the usual forward visual range toward the at least one on-vehicle device.

2. The head-up display device according to claim 1, wherein
the at least one on-vehicle device outputs an operation detection signal to the visual-line shift detecting means when the at least one on-vehicle device is operated, and wherein
the visual-line shift detecting means detects, based on the operation detection signal, which at least one on-vehicle device is operated and whether an operation of the at least one on-vehicle device requires more than a first predetermined time, to judge the visual line shift of the driver.

3. The head-up display device according to claim 2, wherein
the display position shifting means has a time that starts to count time when the visual-line shift detecting means judges the visual line shift of the driver, and wherein
the display unit ceases a production of the alarm display image when the timer counts up a second predetermined time.

4. The head-up display device according to claim 3, wherein
the display position shifting means shifts positions of the display area so that the alarm display image is on a line between the usual forward visual range and the at least one on-vehicle device at operation when the visual-line shift detecting means detects the visual line shift from the usual forward visual range toward the at least one on-vehicle device.

5. The head-up display device according to claim 4, further comprising:
an obstacle detection means for detecting an obstacle located in front of the vehicle to output an obstacle detection signal and an obstacle judgment means for judging the obstacle based on the obstacle detection signal, wherein
the display unit produces the alarm display image in the display area when the obstacle judging means judges existence of the obstacle.

6. The head-up display device according to claim 5, wherein
a position of the display area is determined according to one of a steering angle and a vehicle speed.

7. The head-up display device according to claim 6, wherein
the at least one on-vehicle device is located in a center console.

8. The head-up display device according to claim 6, wherein
the at least one on-vehicle device is left and right door mirrors, and the visual-line shift detecting means detects an operation for adjusting an angle of the door mirrors.

9. The head-up display device according to claim 1, wherein
the display position shifting means has a time that starts to count time when the visual-line shift detecting means judges the visual line shift of the driver, and wherein
the display unit ceases a production of the alarm display image when the timer counts up a second predetermined time.

10. The head-up display device according to claim 9, wherein
the display position shifting means shifts positions of the display area so that the alarm display image is on a line between the usual forward visual range and the at least one on-vehicle device at operation when the visual-line shift detecting means detects the visual line shift from the usual forward visual range toward the at least one on-vehicle device.

11. The head-up display device according to claim 10, wherein
an obstacle detection means for detecting an obstacle located in front of the vehicle to output an obstacle detection signal and an obstacle judgment means for judging the obstacle based on the obstacle detection signal, wherein
the display unit produces the alarm display image in the display area when the obstacle judging means judges existence of the obstacle.

12. The head-up display device according to claim 1, wherein the display position shifting means shifts positions of the display area so that the alarm display image is on a line between the usual forward visual range and the at least one on-vehicle device at operation when the visual-line shift detecting means detects the visual line shift from the usual forward visual range toward the at least one on-vehicle device.

13. The head-up display device according to claim 12, wherein
an obstacle detection means for detecting an obstacle located in front of the vehicle to output an obstacle detection signal and an obstacle judgment means for judging the obstacle based on the obstacle detection signal, wherein
the display unit produces the alarm display image in the display area when the obstacle judging means judges existence of the obstacle.

14. The head-up display device according to claim 1, wherein
an obstacle detection means for detecting an obstacle located in front of the vehicle to output an obstacle detection signal and an obstacle judgment means for judging the obstacle based on the obstacle detection signal, wherein
the display unit produces the alarm display image in the display area when the obstacle judging means judges existence of the obstacle.

15. The head-up display device according to claim 14, wherein
a position of the display area is determined according to one of a steering angle and a vehicle speed.

16. The head-up display device according to claim 15, wherein
the at least one on-vehicle device is located in a center console.

17. The head-up display device according to claim 15, wherein
the at least one on-vehicle device is left and right door mirrors, and the visual-line shift detecting means detects an operation for adjusting an angle of the door mirrors.

18. The head-up display device according to claim 1, wherein
a position of the display area is determined according to one of a steering angle and a vehicle speed.

19. The head-up display device according to claim 1, wherein
the at least one on-vehicle device is located in a center console.

20. The head-up display device according to claim 1, wherein
the at least one on-vehicle device is left and right door mirrors, and the visual-line shift detecting means detects an operation for adjusting an angle of the door mirrors.

* * * * *